United States Patent Office 3,537,817
Patented Nov. 3, 1970

---

3,537,817
PROCESS FOR THE PREPARATION OF ANHYDROUS HYDROFLUORIC ACID
Roland Bachelard, Lyon, France, assignor to Ugine Kuhlmann, Paris, France, a corporation of France
No Drawing. Filed Dec. 4, 1968, Ser. No. 781,252
Claims priority, application France, Dec. 6, 1967, 131,128
Int. Cl. C01b 7/22
U.S. Cl. 23—153                8 Claims

---

ABSTRACT OF THE DISCLOSURE

A process for preparing anhydrous hydrofluoric acid from aqueous solutions of fluosilicic acid by (1) neutralizing the solution and precipitating silica by addition of ammonia and forming an ammonium fluoride, (2) adding a metal fluoride to the ammonium fluoride to form a double fluoride of ammonia and the metal, (3) heating the double fluoride and adding thereto ammonium fluoride to generate ammonia, ammonium difluoride, ammonium cryolite, (4) heating the cryolite and difluoride to generate hydrofluoric acid and a double fluoride of the metal and ammonium which is decomposed for recycling wherein all by-products of the process are recycled to maintain a closed system.

---

My invention relates to a novel industrial process for economically preparing anhydrous hydrofluoric acid and, in particular, preparing hydrofluoric acid from fluosilicic acid.

Aqueous solutions of fluosilicic acid are generally obtained during scrubbing or washing of gases released as by-products of various industrial processes, such as the preparation or concentration of phosphoric acid or superphosphates. In order to use the fluosilicic acid and recover the fluorine values therefrom, many processes have been proposed. Some of these processes result in fluoro compounds, such as aluminum fluoride, cryolite, ammonium difluoride, sodium fluosilicate, hydrofluoric acid, etc. Of the great number of products sought, hydrofluoric acid is the most valuable, and, therefore, the most sought after.

Generally, the most common process for preparing hydrofluoric acid from fluosilicic acid involves the precipitation of silica by reacting ammonium hydroxide with a solution not exceeding 28 percent by weight $H_2SiF_6$. Silica is filtered leaving ammonium fluoride which usually has a concentration of less than 300 g./liter. The ammonium fluoride is heated to evaporate the water while simultaneously converting the fluoride to difluoride. Heating of the ammonium fluorides is carried out at temperatures less than 220° C. The resultant ammonium difluoride is then treated with concentrated sulfuric acid at a temperature of approximately 190° C. Hydrofluoric acid is released in yields of greater than 95 percent, and the ammonium ion is recovered in the form of ammonium acid sulfate.

The following is a flow diagram of the usual process for obtaining hydrofluoric acid from fluosilicic acid:

(i) neutralizing the fluosilicic acid $$H_2SiF_6 + 6NH_4OH \rightarrow Si(OH)_4 + 6NH_4F + 2H_2O$$
precipitate     solution       (A)

(ii) separating the silica by filtration, (iii) heating to a temperature not greater than 220° C. to evaporate the solvent and convert the fluoride to a difluoride, $$6NH_4F \rightarrow 3NH_4F \cdot HF + 3NH_3 \quad (B)$$

(iv) treating the difluoride with sulfuric acid at approximately 190° C., $$3NH_4F \cdot HF + 3H_2SO_4 \rightarrow 3(NH_4)HSO_4 + 6HF \quad (C)$$

Accordingly, the general reaction is:

$$H_2SiF_6 + 3NH_3 + 4H_2O + 3H_2SO_4 \rightarrow$$
$$Si(OH)_4 + 3(NH_4)HSO_4 + 6HF$$

While this process provides relatively high yields of hydrofluoric acid, it has many disadvantages. Most important of these disadvantages are: (a) the high cost of evaporation during reaction (B), (b) the consumption of sulfuric acid in reaction (C), (c) the production of ammonium acid sulfate which has practically no commercial value, (d) the loss of at least half of the ammonia in the form of the acid sulfate, and (e) the corrosive effects to the reaction vessels caused in reactions (B) and (C).

My process, on the other hand, overcomes these disadvantages and provides an economic method for obtaining hydrofluoric acid from fluosilicic acid. My invention provides for the production of anhydrous hydrofluoric acid wherein all of the reagents utilized in the various steps are recycled products of other steps in the same process.

Generally, my process comprises neutralizing a solution of fluosilicic acid to precipitate out the silicic acid. For neutralization purposes, I prefer to use ammonia. The precipitate is filtered to leave a clear solution which contains ammonium fluoride. The ammonium fluoride is extracted by precipitation using a metal fluoride. The precipitate is a double fluoride of ammonia and the metal which is separated from the solution and squeezed. Ammonium fluoride, from another step in the process, is heated by a microevaporation process to form ammonia which is recycled to the neutralization step.

The ammonium difluoride is reacted with an additional quantity of the same metal fluoride previously used. This reaction generates a release of anhydrous hydrofluoric acid, which is collected, as well as the formation of a double fluoride of ammonium and metal. The double fluoride is decomposed by heating to regenerate both the metal fluoride and ammonium fluoride which are recycled to the previous steps.

I generally prefer to use aluminum fluoride as my metal fluorides since these are most commonly encountered in the industrial area. However, any metal fluorides which are effective in the process may be used so long as they fulfill the following conditions:

(a) the double fluoride of ammonium and metal is decomposable upon heating to give ammonium fluoride and a fluoride of the metal;
(b) The double fluoride has a low solubility in water;
(c) The ability to separate gas-solids during the decomposition of the double fluoride; and,
(d) The double fluoride must be stable at the temperature required to generate the hydrofluoric acid.

Generally, the following metals will form suitable double fluorides: Al, Zr, Fe, In, Cr, V, Ni, Th, Ti. In addition, the metal fluoride that is used to react with the solution of ammonium fluoride may itself already be a double fluoride of the metal and ammonium of the same series as the precipitated double fluoride but having a lower coordination index. For example, double fluoride may be $NH_4AlF_4$, $NH_4ZrF_5$, $NH_4FeF_4$, $NH_4-InF_4$, $NH_4CrF_4$, $NH_4VF_4$, etc.

According to one procedure of carrying out my invention, the precipitated double fluoride of ammonium and metal is taken out of the reactor, squeezed and then dried in order to avoid hydrolysis. It is then added to the double fluoride remaining in the reactor after the release of hydrofluoric acid. The remaining double fluoride and added double fluoride are then decomposed by heating. In this case, the dry ammonium fluoride is humidified with water prior to microevaporation.

According to another procedure of carrying out my invention, the double fluoride is squeezed and then mixed in the wet state with dry ammonium fluoride. The wet double fluoride provides the water necessary for microevaporation. This step dries the double fluoride at the same time that the difluoride is produced. The products are not separated, however, since under the conditions of the process the precipitated double fluoride will remain in the reactor without reacting until it is decomposed along with the double fluoride produced during the release of hydrofluoric acid. This method of carrying out the process eliminates the need for drying apparatus for the double fluoride. This economy is somewhat offset by the need for a larger reactor since the double fluoride acts as an inert ballast during a part of the operation.

Both of these embodiments of my invention will be described more fully hereinafter. The first method will be described in terms of aluminum fluoride as the starting material, and the second method as utilizing a double fluoride of aluminum and ammonium with a coordination index of the aluminum lower than that of ammonic cryolite.

PROCEDURE I

The fluosilicic acid solution is neutralized with ammonium hydroxide according to the following reaction:

$$H_2SiF_6 + 6NH_4OH \to Si(OH)_4\downarrow + 6NH_4F + 2H_2O \quad (1)$$

The silica is removed from the system by filtration. The ammonium fluoride solution is then heated with aluminum fluoride to a temperature not greater than 100° C. to precipitate out the fluorine in the form of ammonium cryolite according to the following reaction:

$$6NH_4F + 2AlF_3 \to (2NH_4)_3AlF_6 \quad (2)$$

The wet precipitate is then mixed with dry ammonium fluoride, recycled from another step, and the mixture is heated to approximately 180° C. The ammonium fluoride crystals in the presence of a quantity of water, which comprises between 2 to 20 percent of their weight, are converted, substantially stoichiometrically, into dry ammonium difluoride and gaseous ammonia without any appreciable loss of fluorine. Simultaneously with the conversion of the ammonium fluoride into ammonium difluoride, the ammonium cryolite is dried without taking part in the reaction according to the following microevaporation process:

Aluminum fluoride is added to the mixture of difluoride and cryolite and the mixture is heated to between 100 and 190° C. to generate hydrofluoric acid. The cryolite takes no part in the reaction generating the hydrofluoric acid:

$$2(NH_4)_3AlF_6 + 6NH_4 \cdot HF + 2AlF_3 \to$$
$$4(NH_4)_3AlF_6 + 6HF\uparrow \quad (4)$$

The gaseous hydrofluoric acid is then collected for example, in water, and the cryolite is decomposed by heating to a temperature generally less than 300° C.

$$4(NH_4)_3AlF_6 \to 12NH_4F\uparrow + 4AlF_3 \quad (5)$$

The conditions for Reaction 5 must be such as to obtain the β variety of $AlF_3$ which is necessary for Reaction 2. Thus, Reaction 5 should be operated at the lowest possible temperature.

The ammonium fluoride is collected by condensation as it is released.

The following is a recycling diagram of the various constituents of my process according to the above procedure:

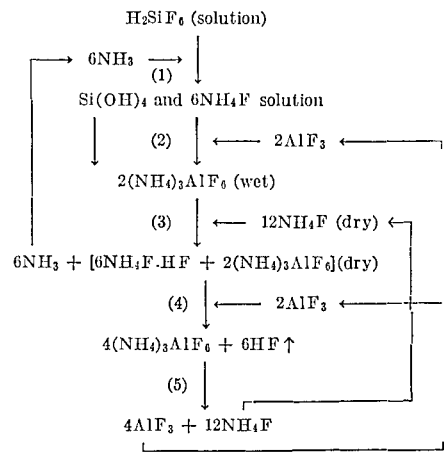

As can be seen from the balanced reaction equations, the quantity of the products obtained by decompositions Reaction 5 is equal to that required in the prior steps. However, losses attributable to sampling and other unavoidable losses must be taken into consideration. Accordingly, a slight excess of the constituents is needed.

My process for obtaining hydrofluoric acid from fluosilicic acid has numerous advantages over the now known processes. In the first place, in my process there is an energy gain due to the fact that ammonium difluoride is obtained from a mixture having relatively little water. Therefore, less energy is required to effectuate evaporation. Usually the $H_2O/F$ ratio is anywhere from 5 to 10, whereas in my process, the ratio is about 0.6 or less. Furthermore, the ammonia that is generated is mixed with a small quantity of water vapor and is recoverable in a concentrated solution which is at once utilizable or it can be collected as a dry gas by merely cooling the gas as it is generated. Moreover, the formation of hydrofluoric acid does not require a consumption of reactants nor are the reactive conditions violently corrosive.

PROCEDURE II

The fluosilicic acid solution is neutralized as it was in Procedure I, that is, with ammonium hydroxide according to:

$$H_2SiF_6 + 6NH_4OH \to Si(OH)_4\downarrow + 6NH_4F + 2H_2O \quad (1')$$

The silica is similarly removed by filtration. To the remaining ammonium fluoride solution is added mono-ammonium aluminum fluoride which is heated to a temperature not greater than 100° C. Fluorine is precipitated out of the solution in the form of ammonium cryolite:

$$6NH_4F + 3NH_4AlF_4 \to 3(NH_4)_3AlF_6\downarrow \quad (2')$$

The wet precipitate is mixed with dry ammonium fluoride recycled from a succeeding step. The mixture is then heated to a temperature not in excess of 200° C. to effectuate microevaporation as in Procedure I to form ammonium difluoride:

To the resultant mixture of cryolite and difluoride is added mono-ammonium aluminum fluoride. This mixture is heated to a temperature less than 190° C. to generate hydrofluoric acid:

$$3(NH_4)_3AlF_6 + 6NH_4F \cdot HF + 3NH_4AlF_4 \to$$
$$6(NH_4)_3AlF_6 + 6HF\uparrow \quad (4')$$

The hydrofluoric acid is collected and the cryolite is heated for decomposition:

$$6(NH_4)_3AlF_6 \to 12NH_4F + 6NH_4AlF_4 \quad (5')$$

The entire second process is represented by the general equation:

$$H_2SiF_6 + 4H_2O \rightarrow Si(OH)_4 + 6HF$$

The cycle is closed except for losses due to necessary sampling and excesses and all of the intermediate products are reemployed. The cryolite formed to remove the fluorine from the $NH_4F$ solution is used as an inert ballast during the remaining step.

The following is a recycling diagram of the various constituents of my process according to the above procedure:

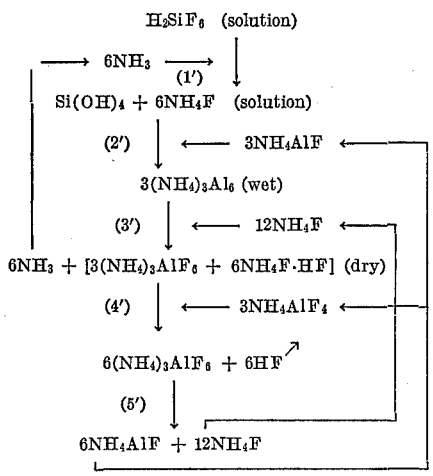

Procedure II provides the same benefits as are derived from the utilization of Procedure I, except that there are no particular requirements for the thermic decomposition (5') even on very large scale operations.

The following examples illustrate the operation of both procedures:

Example I 1,498 g. of fluosilicic acid in the form of a 28 percent solution were used as the starting material.

According to known processes, the liquor solution was treated with ammonium hydroxide up to an excess of about 10 percent. The process required the use of 69.5 moles of $NH_3$, 51.5 of which came from the recycling and 18.0 were brought into the system to compensate for unavoidable losses when the industrial scale had not yet been reached, and for losses due to sampling for the analyses and tests. A yield of 98 percent was reached; the reaction gave, after filtering and washing the silica cake, 7.67 liters of $NH_4F$ solution at 270 g./liter. The solution was raised to 90° C., and mixed with 1,562 g. of dry $AlF_3\beta$. The $AlF_3$ was provided by the cycle up to the extent of 14.55 moles, whereas the complement, i.e., 4.05 moles, was provided from outside the system. Afer cooling and filtering, a cake was collected weighing 3.514 kg. and having 10.7 percent water. The operation was carried out with an 87 percent yield and resulted in a wet cryolite. The cryolite was mixed with 4,288 g. of dry and pure $NH_4F$, 96.5 percent originating from the cycle and 3.5 percent from an outside complement. The magma was placed in a Monel metal reactor and progressively heated to 185° C. Ammonia was collected by condensing and a concentrated solution containing 51.5 moles of $NH_3$ was returned to the starting treatment. In the reactor there remained a solid comprising two constituents: (1) the dried ammonium cryolite: 3,138 g.; (2) the solid ammonium difluoride: 2,935 g., a conversion yield of 92 percent having been achieved. Into this powder, $AlF_3$ was introduced which originated from the cycle and had a 10 percent excess compared to the stoichiometry of the reaction (4), i.e., 1,587 g. This mixture was progressively heated to 185° C. 1.0 kg. of hydrofluoric acid was collected by condensing. The residue comprised 6,490 g. of ammonic cryolite and 185 g. of $AlF_3$ which were not reacted. The residue was rapidly heated at 400° C. in a muffle furnace. Decomposition of cryolite took place and 1,912 g. of $NH_4F$ were condensed from the vapors. 33.4 moles of $AlF_3\beta$ remained at the bottom of the reactor which were reintroduced into the process.

Example II

Gases issuing from a production of superphosphates were washed with water to provide an aqueous solution of 25 percent fluosilicic acid.

9.109 moles of the fluosilicic acid containing 2.86 moles of $NH_4F$ and 5.47 moles of $NH_3$ from a recycling solution used in the washing were used with the starting material.

This solution was treated according to known processes with a 10 percent excess of ammonia, i.e., 54.65 moles of ammonia, 47.25 moles thereof originating from the cycle, the remaining 7.40 moles were supplemented.

The yield of the reaction with ammonia (1) was 98 percent. After separating and washing the silica, a solution of 57.45 moles of ammonium fluoride, containing 5.47 moles $NH_3$ was obtained.

The solution was heated to 85° C. and 25 moles of tetrafluoaluminate originating from the cycle were added. The ammonium fluoride was in excess of 15 percent compared to the stoichiometry of Reaction 2'. After maintaining contact for one hour under a slow stirring, the phases were separated by filtering. The yield of the operation was 87 percent based on the $Al^{3+}$ ion.

The liquid phase contained 2.86 moles of $NH_4F$ and 5.47 moles of $NH_3$. It was entirely recycled for washing the gases.

The solid phase was composed of 21.75 moles of wet ammonic cryolite (7 percent water) and 3.25 moles of mono-ammonium aluminum fluoride.

110.6 moles of $NH_4F$ were mixed with this product, only 1.0 mole of which was required to be added to the system, and 3.75 moles of $NH_4F \cdot HF$ originated from the recycling.

The magma underwent a progressive heating to 190° C. During this operation (3), there were released 47.25 moles of $NH_3$ which were returned to the neutralization of the fluosilicic acid. In the Monel metal reactor used to make the conversion, there remained 25 moles of dry cryolite and 53.75 moles of ammonium difluoride as well as 10.6 moles of unconverted $NH_4F$. In fact, the yield of the reaction did not exceed 91 percent.

The solid residue was added to 28 moles of ammonium tetrafluoaluminate admitted with a 4 percent excess. Reaction 4' was effected by heating the mixture up to 190° C. The yield of 4' was limited to 93 percent so that 50 moles were collected, i.e., 1 kg. of anhydrous hydrofluoric acid, and 50 moles of ammonic cryolite. The solid phase contained 7.25 moles of tetrafluoaluminate and 3.75 moles of $NH_4F \cdot HF$ which had not reacted. It is to be noted that there were 10.6 moles of unconverted $NH_4F$ in the prior step.

The solid was heated for 3 hours at 225° C. in a fluidized bed by dry air in a Monel apparatus. The thermic decomposition of the cryolite according to 5' took place with a yield of 99 percent. Vapors condensing provided 109.6 moles of $NH_4F$ and 3.75 moles of ammonium difluoride. In addition there were produced 56.75 moles of ammonium tetrafluoaluminate which were divided in two portions corresponding to the operations 2' and 4'.

The yield of conversion of the fluosilicic acid into anhydrous hydrofluoric acid finally reached 91.5 percent.

I claim:
1. A method for the preparation of anhydrous hydrofluoric acid from an aqueous solution of fluosilicic acid comprising:
   (A) neutralizing the fluosilicic acid with ammonium to form a precipitate of silica and aqueous solution of ammonium fluoride;

(B) separating the silica;
(C) adding a metal fluoride solution to the ammonium fluoride to form a first mixture;
(D) heating the first mixture to not greater than 100° C. to form a double fluoride of the metal and ammonium which precipitates;
(E) mixing ammonium fluoride with the double fluoride precipitate to form a second mixture;
(F) subjecting the second mixture to microevaporation to form ammonium difluoride and said double fluoride and to generate ammonia;
(G) adding the same metal fluoride to the ammonium difluoride and double fluoride to form a third mixture;
(H) heating the third mixture to a temperature between 100° C. and 190° C. to generate hydrofluoric acid and the double fluoride; and,
(I) heating the double fluoride to form decomposition products of ammonium fluoride and the metal fluoride.
(J) recycling intermediate products to maintain a closed process.

2. A method as set forth in claim 1 wherein the precipitated double fluoride is mixed in the wet state with ammonium fluoride in the dry state to form the second mixture which is dried during microevaporation to obtain ammonium difluoride.

3. A method as set forth in claims 1 or 2 wherein the metal fluoride is selected from the group consisting of Zr, Fe, In, Cr, Al, V, Ni, Th and Ti.

4. A method as set forth in claims 1 or 2 wherein the metal fluoride is $AlF_3$ and the double fluoride of metal and ammonia is ammonic cryolite $(NH_4)_3 AlF_6$.

5. A method as set forth in claims 1 or 2 wherein the metal fluoride is a double fluoride of metal and ammonium and selected from the group consisting of $NH_4ZrF_5$, $NH_4AlF_4$, $NH_4FeF_4$, $NH_4InF_4$, $NH_4CrF_4$ and $NH_4VF_4$.

6. A method as set forth in claims 1 or 2 wherein the metal fluoride is $NH_4AlF_4$ and the double fluoride precipitated is ammonium cryolite $(NH_4)_3AlF_6$.

7. A method as set forth in claim 1 wherein the precipitated double fluoride is dried to prevent hydrolysis and is added to double fluoride remaining after generation of hydrofluoric acid and the mixed double fluorides are subjected to thermic decomposition.

8. A method as set forth in claim 1 wherein the wet double fluoride precipitated is mixed with dry recycled ammonium fluoride, said mixture comprising 2 to 20 percent by weight water and being heated to temperatures not greater than 200° C., to form ammonia and ammonium difluoride.

References Cited
UNITED STATES PATENTS

| | | | |
|---|---|---|---|
| 2,916,352 | 12/1959 | Fitch et al. | 23—88 |
| 2,921,836 | 1/1960 | McCord et al. | 23—88 |
| 3,101,254 | 8/1963 | Cunningham | 23—88 XR |
| 3,123,438 | 3/1964 | Beaver et al. | 23—88 |
| 3,128,152 | 4/1964 | Secord et al. | 23—153 |
| 3,195,979 | 7/1965 | Burkert et al. | 23—153 |
| 3,338,673 | 8/1967 | Peterson et al. | 23—153 |

EDWARD STERN, Primary Examiner

U.S. Cl. X.R.
23—88, 193

UNITED STATES PATENT OFFICE
CERTIFICATE OF CORRECTION

Patent No. 3,537,817                Dated November 3, 1970

Inventor(s) Roland Bachelard

It is certified that error appears in the above-identified patent and that said Letters Patent are hereby corrected as shown below:

Column 3, line 51, "12 $NH_3F$" should read -- $12NH_4F$ --.

Column 5, line 31, "$6NH_4AlF$" should read -- $6NH_4AlF_4$ --.

Signed and sealed this 29th day of December 1970.

(SEAL)
Attest:

EDWARD M. FLETCHER, JR.            WILLIAM E. SCHUYLER, JR.
Attesting Officer                  Commissioner of Patents